Patented May 18, 1943

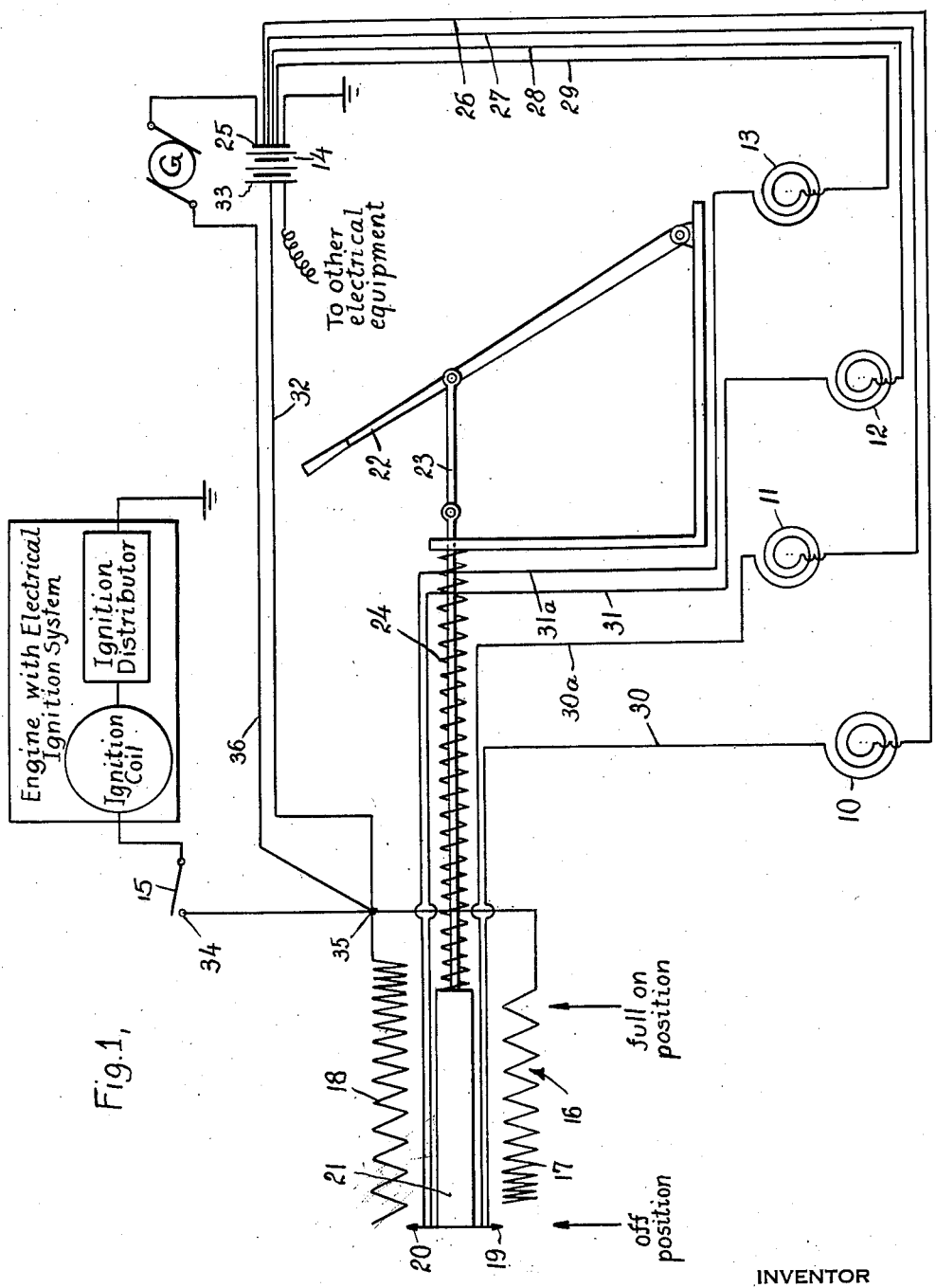

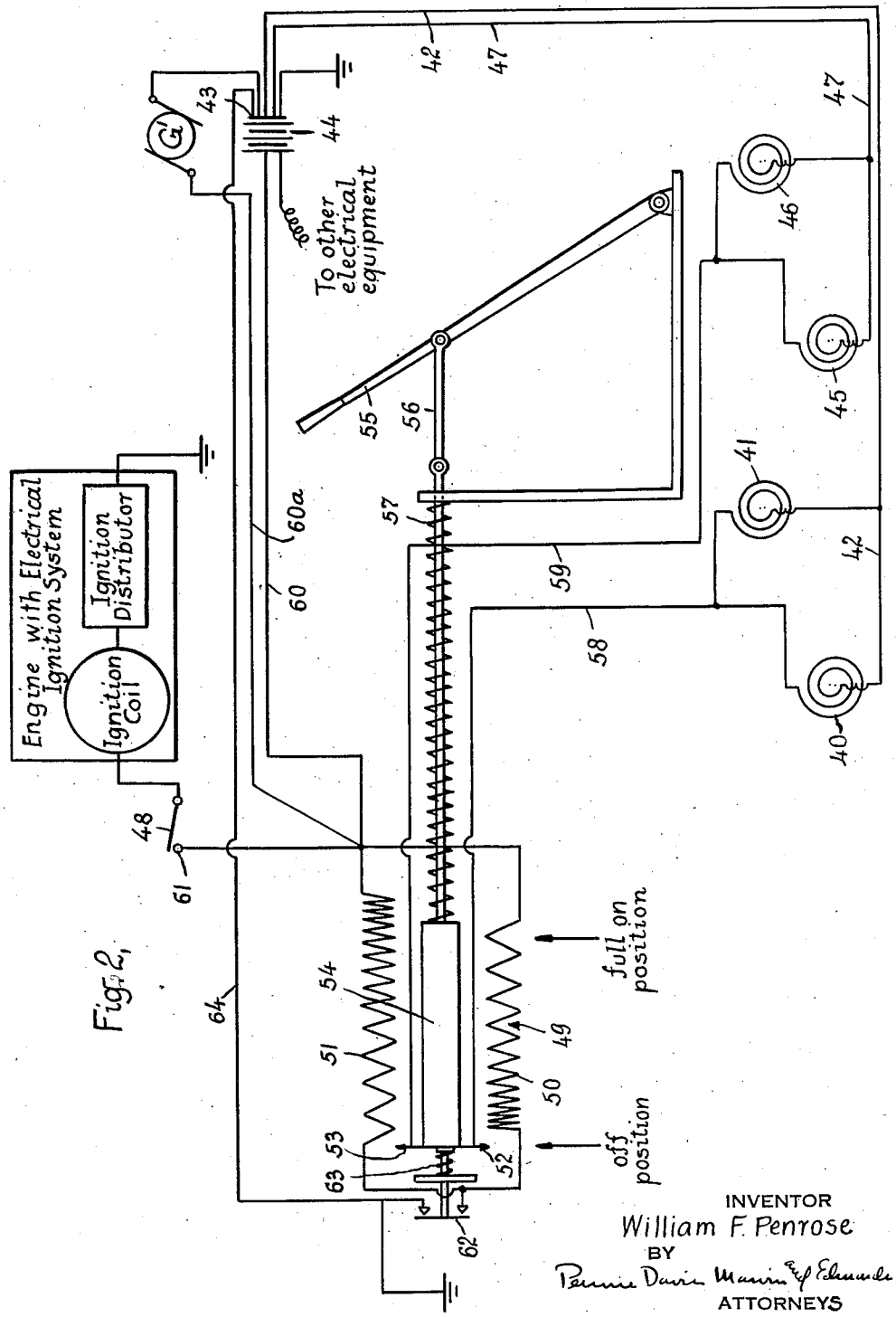

2,319,258

UNITED STATES PATENT OFFICE 2,319,258

ELECTRIC BRAKE CONTROL SYSTEM

William F. Penrose, Irvington, N. J., assignor to Empire Electric Brake Corporation, a corporation of Delaware Application September 4, 1940, Serial No. 355,327

10 Claims. (Cl. 188—158)

This invention relates to a control system for electrically actuated brakes, and more particularly to a brake control system for an automotive vehicle equipped with electrically actuated brakes. The invention has for its object to provide an improved electric brake control system by means of which safe operation of the electrically actuated brakes is assured and the danger of brake failure due to electrical failure is minimized, and at the same time maximum brake effectiveness and smooth braking operation is attained.

The invention further provides an improved method of connecting electrically actuated brakes in an automotive vehicle in a manner to achieve the foregoing object.

In an automotive vehicle including an engine having an electrical ignition system, a battery, an ignition switch in circuit between the battery and the ignition system, an electrically operated brake, and a controller for the brake, the method of the invention for connecting the brake, controller, battery, and ignition switch, advantageously comprises connecting one terminal of the brake by an independent wire directly to the grounded terminal of the battery. In consequence operation of this brake remains unaffected by any defects that may be present or develop in the ordinary ground circuit of the battery, and the safety of the brake is correspondingly enhanced.

Further in accordance with the method of the invention, the other terminal of the brake advantageously is connected directly to one terminal of the brake controller, and the other terminal of the brake controller is connected directly to the ungrounded terminal of the battery. One terminal of the ignition switch advantageously is then connected directly to the battery-connected terminal of the controller. In this manner both the controller and the ignition switch are connected to the ungrounded terminal of the battery through the same conductor. This conductor thus carries current both to actuate the brakes and to supply the ignition system of the vehicle. Should this conductor fail for any reason and thereby render the brakes inoperative, it will at the same time render the engine ignition system inoperative, and it will be impossible for the vehicle to be driven under the power of its engine until the defect is corrected and the brakes are restored to operativeness. As a result, the safety of the brake is further enhanced.

In cases where a generator driven by the vehicle engine is employed to maintain the battery charged, the generator, instead of being connected directly to the ungrounded terminal of the battery, advantageously is connected by an independent conductor to the battery-connected terminal of the controller, so that it charges the battery through the conductor connecting the controller directly to the battery. Then if the latter conductor should fail, the generator will be able to supply current for the brakes so long as the vehicle continues in operation with its engine running. If on the other hand the conductor connecting the generator to the battery-connected terminal of the controller should fail, the brakes and engine will be supplied with current directly from the battery. With this arrangement it is necessary for failures to occur in both of these conductors before the brakes will be caused to fail during operation of the engine, and in such event the engine also will be put out of operation.

In the case of a vehicle equipped with front and rear wheel electrically actuated brakes, a controller having separate front and rear wheel brake control circuits advantageously is employed. In such a vehicle one terminal of the rear wheel brake control circuit of the controller is connected by a conductor to one terminal of each rear wheel brake, and one terminal of the front wheel brake control circuit of the controller is connected by a separate conductor to one terminal of each of the front wheel brakes. The other terminals of the front and rear wheel brake control circuits may be connected to the ungrounded terminal of the battery, and the other terminals of the front and rear wheel brakes may be connected to the grounded terminal of the battery, advantageously as described above.

By employing a brake controller having separate front and rear wheel brake control circuits which are separately connected to the front and rear wheel brakes respectively, the safety of the brake is still further enhanced. Any electrical failure in the connections between the front wheel brakes, for example, and the controller, will not affect safe operation of the rear wheel brakes, and conversely a failure in the connections between the rear wheel brakes and the controller will not affect operation of the front wheel brakes. Likewise should a failure occur in either control circuit of the controller, only operation of the brakes connected to that control circuit will be affected, and the brakes connected to the other control circuit may still be operated.

It is desirable in a vehicle having front and rear wheel brakes connected to a brake controller having front and rear wheel brake control circuits, as described above, to connect the front wheel brakes to the grounded (or other terminal) of the battery by a separate conductor from that which connects the rear wheel brakes thereto, so that if a failure should occur in either conductor, only the brakes connected to that conductor will be affected and the other brakes can still be operated safely.

The separate front and rear wheel brake control circuits of the controller may be either simple resistance winding circuits, or they may be potentiometrically connected circuits.

In consequence of the provision of separate front and rear wheel brake control circuits or windings in the controller, it is possible to proportion the degree of energization of the front wheel brakes relatively to the rear wheel brakes to attain maximum braking effectiveness. This may be accomplished by providing a single controller operating member for operating both front and rear wheel control circuits or windings simultaneously, and constructing and arranging the control circuits or windings relatively to each other so that, as the controller operating member is advanced toward the point of maximum brake energization with the vehicle moving forwardly, that proportion of the total braking effort produced and attributable to energization of the front wheel brakes is increased in approximately the same proportion that the load carried by the vehicle front wheels is increased, as the increasing rate of deceleration of the vehicle causes the center of gravity thereof to shift forward and increase the proportion of the total load carried by the front wheels. In this manner the braking effort exerted by the front and rear wheels is at all times maintained in approximately the same proportion relatively to each other as the loads carried by the front and rear wheels respectively, in consequence of which maximum braking effectiveness is achieved.

The invention further provides an improved controller for electric front and rear wheel vehicle brakes, designed to enable attainment of the safety factors and improved braking effectiveness described above. Such a controller preferably comprises a front wheel brake control resistance winding and a similar but separate rear wheel brake control winding. Separate front and rear wheel contact members each are mounted for movement along and in contact with the corresponding control resistance winding from an off-position to an on-position, and a single controller operating member is provided for moving said contact members together from the off-position to the on-position. Such a controller may be constructed and wired either for simple resistance rheostat control of the current supplied to the vehicle brakes, or for potentiometric control of such current.

The invention will be better understood from a consideration of the following description considered in connection with the accompanying drawings, in which Fig. 1 is a diagrammatic showing of a brake control system according to the invention in which a simple resistance controller is employed; and Fig. 2 is a diagrammatic showing of a similar control system in which a potentiometric controller is employed.

Referring to Fig. 1 of the drawings, a control system is shown for a vehicle equipped with two electrically actuated front wheel brakes 10 and 11 and two electrically actuated rear wheel brakes 12 and 13. Although the control system shown may be used with any suitable form of electrically actuated brakes, electromagnetically actuated brakes of the type described and claimed in my co-pending application Serial No. 321,169, filed February 28, 1940, now Patent No. 2,273,065, Feb. 17, 1942, may be used with advantage.

The vehicle also is provided with a storage battery 14 or other suitable source of electrical energy for actuating the brakes and for supplying other electric requirements of the vehicle and its equipment. A generator G driven by the engine of the vehicle may be provided to keep the storage battery charged and to supply the brakes with electrical energy should the battery fail while the engine is in operation.

The vehicle is equipped with an internal combustion engine having an electrical ignition system to which electrical energy is supplied by the battery or generator through an ignition switch 15.

A controller indicated generally at 16 is provided for controllably energizing the brakes. The controller is provided with a front wheel brake control circuit 17 and a rear wheel brake control circuit 18. In the controller shown in Fig. 1 the two brake control circuits of the controller are in the form of resistance elements or windings. A front wheel contact member 19 is mounted for movement along and in contact with the front wheel brake control winding 17, and a similar rear wheel contact member 20 is mounted for movement along and in contact with the rear wheel brake control winding 18. The contact members 19 and 20 are mounted on a single controller operating member 21 which is adapted to move both contact members together from an off-position to a full on-position, as indicated diagrammatically by the arrows in the drawings.

The controller operating member is indicated schematically as being actuated by a lever 22 connected thereto by a suitable linkage 23. The lever is pulled (to the right, as shown in the drawings) to move the controller operating member 21 and the contact members 19 and 20 carried thereby from the off-position toward the full on-position, and a compression spring 24 serves to return the controller operating member 21 to the off-position when the lever 22 is released.

As shown in the drawings, one terminal of each of the front and rear wheel brakes 10, 11, 12 and 13 is connected to the grounded terminal 25 of the battery. In order to insure against the loss of all brakes in the event of a failure in the electrical connection between the brakes and the grounded terminal of the battery, each brake 10, 11, 12 and 13 is shown connected directly to the ground terminal of the battery by a separate conductor 26, 27, 28 and 29 respectively, independent of the battery ground circuit. In consequence of this manner of connecting the brakes to the battery, a failure of any one conductor 26, 27, 28, or 29 will affect operation only of the brake to which it is connected. Since it is most unlikely that more than one conductor will fail at any given time, the danger of simultaneous failure of all brakes is reduced to a minimum.

Although in the drawings I have shown separate conductors 26, 27, 28, and 29 for each individual brake 10, 11, 12 and 13, respectively, it is possible instead to connect both front brakes 10 and 11 to the terminal 25 of the battery by means of a common conductor, and to connect the rear brakes 12 and 13 to the terminal 25 of the battery by a separate common conductor. This modification has the advantage of economy in that only two wires from the brakes to the battery need be employed, and it does not seriously reduce the safety of the brake control system, for a failure of either of the common conductors will affect only the pair of brakes with which it is connected, and will not affect the other pair of brakes. If, with this described modification, one conductor should fail, the availability of two brakes will be lost, but there will be no unbalance of the brakes on either side of the vehicle, and hence although the total braking effort will be less, there will be no tendency of the vehicle to swerve to either side due to excessive braking on one side of the vehicle as compared with the other. A modification of this sort is illustrated in Fig. 2, diagrammatically showing front wheel brakes 40 and 41 connected to a battery 44 by a common conductor 42, and rear wheel brakes 45 and 46 connected to the battery 44 by a second common conductor 47.

The front wheel brakes 10 and 11 are connected by individual conductors 30 and 30a to the front wheel contact member 19 of the controller, and the rear wheel brakes 12 and 13 are connected by individual conductors 31 and 31a to the rear wheel contact member 20 of the controller. In consequence of this arrangement for connecting the front and rear wheel brakes separately to the controller, a failure in any one of these conductors will result in the loss of only that brake to which the failing conductor is connected, and hence a failure in this part of the system will affect only one of the four vehicle brakes and not all of them. This safety factor is to an extent carried through the controller itself, for the front wheel brakes are supplied with current through the front wheel brake control winding 17 and the front wheel contact member 19, and the rear wheel brakes are separately supplied with current through the rear wheel brake control winding 18 and the rear wheel contact member 20. A failure in either control winding or in either contact member will affect only the pair of brakes with which it is connected and will leave unaffected the operation of the other pair of brakes.

It is, of course, possible to connect both front wheel brakes 10 and 11 by means of a single conductor to the front wheel brake control member 19, and to connect both rear wheel brakes 12 and 13 by a separate single conductor to the rear wheel brake control member 20, without seriously affecting the safety of the brake control system and with a gain in economy. Such a modification of the arrangement for connecting the brakes to the controller corresponds to the above described modification for connecting the brakes to the grounded terminal of the battery. A modification of this sort is illustrated diagrammatically in Fig. 2, showing front wheel brakes 41 connected by a common conductor 58 to a front wheel brake control member 52, and further showing rear wheel brakes 45 and 46 connected by a common conductor 59 to a rear wheel brake control member 53.

Each of the front and rear wheel brake control windings 17 and 18 is connected by a wire 32 to the ungrounded terminal 33 of the battery. One terminal 34 of the ignition switch 15 through which the ignition system of the engine is supplied with current from the battery or generator is connected directly to the battery-connected terminal 35 of the controller 16, so that both the controller 16 and the ignition switch 15 are connected to the battery through the same wire 32. The generator G, instead of being connected directly to the ungrounded terminal 33 of the battery, is connected by a separate conductor 36 directly to the battery-connected terminal 35 of the controller. The generator thus charges the battery through the conductors 36 and 32. This manner of connecting the ignition switch to the battery and generator enhances the safety of the brakes for in the event of failure of the conductor 32 connecting the controller to the battery, the brakes will still be supplied with current from the generator so long as the engine continues to operate. On the other hand, failure of the conductor 36 connecting the controller to the generator will not affect operation of the brakes, as current will then be supplied to them from the battery through the conductor 32. Only in the event of simultaneous failure of both conductors 32 and 36 will operation of the brakes be affected, and in such event the engine also will be put out of operation and the vehicle cannot be driven under power of its engine.

From the foregoing it is apparent that a failure of any single conductor cannot affect operation of more than one brake. With the engine in running condition, at least two separate failures in the brake control system are required before all four brakes will be put out of operation.

The provision of separate front and rear wheel brake control windings 17 and 18, through which the front and rear wheel brakes are separately and controllably supplied with electrical energy, makes it possible to secure more effective brake operation simultaneous with the provision of enhanced safety. This is accomplished by constructing and arranging the brake control windings relatively to each other so that as the controller operating member 21 is advanced toward the point of maximum brake energization at the full on-position, with the vehicle moving forwardly, the degree of energization of the front wheel brakes is increased relatively to the degree of energization of the rear wheel brakes approximately in the same proportion that the load carried by the front wheels of the vehicle is increased relatively to the load carried by the rear wheels as the increase in the rate of deceleration of the vehicle causes the center of gravity thereof to shift forwardly. As indicated in the drawings, this effect may be achieved by providing the rear wheel brake control winding 18 with somewhat more resistance than the front wheel brake control winding 17, and arranging the rear wheel brake control winding so that even at the full on-position when substantially all the resistance of the front wheel brake control winding 17 is cut out, some resistance still is left in the circuit of the rear wheel brake control winding.

With uniformly wound control windings 17 and 18, this proportioning of the degree of energization of the front wheel brakes relatively to the rear wheel brakes may be obtained by simply arranging the rear wheel brake control winding 18 so that some resistance is left in circuit even with the controller operating member advanced to the full on-position and substantially all resistance of the front wheel control winding is cut out. In some cases, however, it may be desirable to employ non-uniformly wound control windings 17 and 18 to increase or attain more precisely the proportioning effect described. For example, as indicated in the drawings, the front wheel brake control winding 17 may be wound non-uniformly with a progressively decreasing resistance per unit of length from the off-position to the full on-position, and conversely the rear wheel brake control winding 18 may be non-uniformly wound with a progressively increasing resistance per unit of length from the off-position to the full on-position. Whether uniformly wound or non-uniformly wound control windings are employed, it is advantageous to design the controller so that some resistance is left in circuit in the rear brake control winding with the controller contact members advanced to the full on-position.

Proportioning in the described manner of the degree to which the front wheel brakes are energized relatively to the rear wheel brakes results in energizing the front wheel brakes to an increasingly greater extent relatively to the rear wheel brakes as the controller is advanced farther and farther toward the full on-position. Hence as the rate of deceleration of the vehicle increases and (with the vehicle moving forwardly) the center of gravity thereof is shifted more and more toward the front, thereby progressively increasing the load imposed on the front wheels of the vehicle relatively to the rear wheels, the front wheel brakes exert a proportionately greater part of the total braking effort.

The above-described proportioning of the degree of energization of the front wheel brakes relatively to the rear wheel brakes results in increasing the effectiveness of the brakes, because the braking effort exerted by the front wheel brakes increases as the load on the front wheels increases. The heavier the load carried by the front wheels, the greater is the braking effort which the front wheels are capable of exerting without causing the wheels to slide, and conversely the more the load on the rear wheels is reduced, the less is the braking effort which the rear wheel brakes can exert without causing the rear wheels to slide. Proportioning the degree of energization of front wheel brakes relatively to the rear wheel brakes in the described manner causes the brakes on all four wheels to exert a braking effort under all braking conditions which is in proportion to the maximum braking effort which the load carried by the respective wheels will permit without sliding of the wheels. The brakes thereby are caused to operate with maximum effectiveness.

The precise ratio of resistance in the front wheel brake control winding 17 to resistance in the rear wheel brake control winding 18, and the precise amount of resistance that should remain in circuit in the rear wheel brake control winding with the controller advanced to the full on-position, must be determined in each case for the particular type of vehicle, the relative sizes of the front and rear wheel brakes, the extent to which the center of gravity of the vehicle tends to shift forward for a given increase in the rate of deceleration, and other factors of brake and vehicle design and construction. It may be stated generally, however, that the brake control windings 17 and 18 of the controller will produce most effective brake operation if the resistances of the respective windings are so proportioned that for each increment in the advance of the controller from off-position toward the full on-position with the vehicle moving forwardly, resulting in a given increase in the rate of deceleration of the vehicle, the percentage of the total braking effort exerted by the front wheel brakes increases in substantially direct proportion to the increase in the percentage of the total weight of the vehicle which is carried by the vehicle's front wheels. Although ideal results will be obtained only if this proportion is achieved with mathematical precision, it is of course understood that, for practical purposes, entirely satisfactory results are obtained even if the proportion is merely approximated.

The foregoing description of the control system of the invention has been presented with particular reference to the embodiment shown in Fig. 1, but for the most part it is applicable also to the modified form of control system shown in Fig. 2. In the system shown in Fig. 2, front wheel brakes 40 and 41 are connected by a wire 42 independently of the ground circuit directly to the grounded terminal 43 of the vehicle battery 44. Similar electrically actuated rear wheel brakes 45 and 46 are connected by a second wire 47, which also is independent of the ground circuit, to the grounded terminal 43 of the battery. This arrangement for connecting the brakes to the battery differs from that shown in Fig. 1 (but corresponds to the modification described in connection with Fig. 1) in that a common conductor is employed for connecting both rear wheel brakes to the battery, and a separate common conductor is employed for connecting both front wheel brakes thereto. It is understood, however, that as in the case of the control system shown in Fig. 1, each brake may be connected by a separate conductor directly to the grounded terminal 43 of the battery.

A generator G' driven by the vehicle engine is provided for keeping the battery 44 charged. The vehicle is equipped with an engine having an electrical ignition system supplied with electrical energy through an ignition switch 48.

A controller indicated generally at 49 is provided for the front and rear wheel brakes. The controller comprises a front wheel brake control winding 50 and a rear wheel brake control winding 51. A front wheel contact member 52 and a rear wheel contact member 53 are mounted on a common controller operating member 54, by means of which the contact members 52 and 53 may be moved along and in contact with the control windings 50 and 51 from a full off-position to a full on-position, which positions are indicated by the arrows in Fig. 2. The controller operating member 54 may be actuated by a lever 55 connected to the brake operating member 54 by a suitable linkage 56. A spring 57 may be provided to urge the brake operating member normally toward the off-position.

The front wheel brakes 40 and 41 are connected by a conductor 58 to a front wheel contact member 52, and the rear wheel brakes 45 and 46 are connected by a separate conductor 59 to the rear wheel contact member 53. This arrangement for connecting the brakes to the controller differs from that shown in Fig. 1 (but corresponds to the modification described in connection with Fig. 1) in that a common conductor is employed for connecting both front wheel brakes to the controller, and a separate common conductor is employed for connecting both rear wheel brakes to the controller. It is understood, however, that as in the case of the control system shown in Fig. 1, each brake may be connected by a separate conductor directly to the proper brake control member of the controller.

Each of the front and rear wheel brake control windings 50 and 51 is connected at its terminal adjacent the full on-position by a wire 60 to the ungrounded terminal of the battery. A terminal 61 of the ignition switch 48 is connected to the same terminals of the control windings 50 and 51 as the wire 60, whereby the ignition system and the brake controller each are connected to the battery through the same conductor. A separate conductor 60a serves to connect the ungrounded terminal of the generator G' to the terminal of the controller which is connected to the ungrounded battery terminal. This arrangement is substantially the same as the arrangement described above in connection with Fig. 1.

The controller shown in Fig. 2 is connected as a potentiometric controller rather than as a simple resistance controller. A switch 62, which is normally urged closed by a compression spring 63, is provided at the end of the controller adjacent the off-position thereof. The switch 62 is mounted so that when the controller is released and urged by the spring 57 to its off-position, the controller operating member 54 opens the switch 62. Initial movement of the controller operating member 54 from the off-position causes the switch 62 to close. The provision of such a switch is, of course, to avoid imposing a drain on the battery through the controller windings when the brakes are not in use. One terminal of the switch 62 is connected to each of the brake control windings 50 and 51 at the terminals thereof adjacent the controller off-position. The other terminal of the switch 62 is connected by a wire 64 to the grounded terminal 43 of the battery 44.

With a controller constructed as shown in Fig. 2, initial movement of the controller operating member 54 away from the off-position toward the on-position causes the switch 62 to close and to complete a circuit between the battery and each of the brake control windings 50 and 51. Further motion of the controller operating member 54 toward the full on-position brings the front and rear wheel contact members 52 and 53 into contact with their respective control windings 50 and 51, and the front and rear wheel brakes are energized by the circuit thus completed between the energized control resistance windings 50 and 51, the contact members 52 and 53, the brakes, and the battery.

Control of the brakes by this arrangement is potentiometric rather than simple resistance rheostat control. The potentiometric controller is somewhat more expensive to manufacture and install than the simple resistance rheostat controller, but for some purposes it may be advantageous as it gives a relationship of controller movement to degree of brake energization which is more nearly a direct linear proportion than is obtained by use of the simple resistance rheostat type of control.

In the event of a failure of the wire 64 connecting the switch 62 with the grounded terminal of the battery 44, all brakes will fail without affecting operation of the vehicle engine unless provision is made for an auxiliary circuit between the switch 62 and the grounded terminal 43 of the battery. Such provision may be made conveniently and economically by grounding the terminal of the switch 62 to which the wire 64 is connected, thereby employing the ground circuit of the battery for the auxiliary conductor. If this is done, the potentiometric control system described is substantially as safe from electrical failure as is the resistance rheostat controller of Fig. 1.

It is, of course, understood that the front and rear wheel brake control windings of the potentiometric controller 49 may be constructed and arranged so as to proportion the degree of energization of the front wheel brakes relatively to the rear wheel brakes in accordance with the rate of deceleration of the vehicle and the extent to which the center of gravity thereof is shifted toward the front wheels, substantially as described above.

Although the invention has been described with particular reference to a vehicle equipped with a total of four front and rear wheel electrically actuated brakes, it is equally applicable to a vehicle equipped with more or less brakes on either the front or rear wheels, or both. Features of this invention also may be employed with advantage in any type of vehicle equipped with electrically actuated brakes. For example, it is possible to employ features of the invention in a case where the electrically actuated brakes are mounted on the wheels of a trailer and the controller and the batteries are mounted on a tractor vehicle. Vehicles having more or less than four wheels, such as multi-wheel trucks and motorcycles, equipped with electrically actuated brakes also may embody features of the invention.

Although it is generally advantageous to employ the complete control system of the invention, various features thereof may be employed without other features. For example, all or part of the wiring system of the invention, which enhances safety of the brakes in the event of any single electrical failure in the wiring system, may be employed with or without a controller of such construction as to permit proportioning the energization of the front wheel brakes relatively to the rear wheel brakes in accordance with the load carried thereby at various rates of deceleration, and conversely the latter feature may be employed in conjunction with the former, or it may not be, as desired.

Various modifications may be made in the control system of the invention as specifically described. For example, the conductors by which the brakes are connected to the grounded terminal of the battery may be grounded near their points of connection with the brakes, or a separate conductor may be employed to ground this terminal of any or all of the brakes. In this manner the ground circuit of the battery may be employed as an auxiliary circuit to sustain the brakes in the event of failure of the independent conductors. In such a case a single conductor independent of the ground circuit may serve to connect all brakes to the battery, reliance being had on the ground circuit to maintain the brakes in operation should this conductor fail.

One or more of the safety features of the wiring system may be employed without employing all such features. For example, the parts of the wiring system particularly subject to failure may embody the safety features of the invention, and other parts may not. In cases where a twelve-volt battery and a corresponding generator are employed in a vehicle equipped with brakes and controller designed for six-volt operation, a six-volt tap may be taken from the battery, the generator may be connected to the battery in the usual manner. Other cases also may arise where it is desirable to connect the generator directly to the battery and not through the battery connected terminal of the controller.

As indicated above, the brake control system of the invention is such as to materially enhance safety of the brakes and prevent failure thereof in the event of any likely failure in the wiring and control circuit. The failure of any single conductor cannot cause failure of all brakes, unless at the same time the ignition system of the engine, and hence the engine itself, is put out of operation. The vehicle, therefore, cannot be driven with its engine without at least some of the brakes being operable. A failure in either control circuit of the controller cannot cause all brakes to fail, and a failure of the battery will not permit the brakes to fail unless the generator also fails. In general at least two simultaneous failures will have to occur before all brakes are lost.

I claim:

1. In an automotive vehicle including an engine having an electrical ignition system, a battery, an ignition switch in circuit between said battery and said ignition system, front and rear wheel electrically operated brakes, and a brake controller having separate front and rear wheel brake control circuits, a circuit for connecting the brakes, controller, ignition switch and battery which comprises means electrically connecting one terminal each of the front and rear wheel brakes to one terminal of the battery, means connecting the other terminal of the rear wheel brakes to one terminal of the rear wheel brake control circuit of the controller and means electrically connecting the other terminal of the front wheel brakes to one terminal of the front wheel brake control circuit of the controller, means connecting the other terminals of both front and rear wheel brake control circuits of the controller to the other terminal of the battery, and means connecting the ignition switch directly to the battery-connected terminals of the front and rear wheel brake control circuits of the controller.

2. In an automotive vehicle including a battery, front and rear wheel electrically operated brakes adapted to be energized by said battery, and a controller for said brakes comprising separate front and rear wheel brake control circuits, a circuit for connecting the battery, brakes and controller comprising means electrically connecting one terminal of each of said front and rear wheel brakes directly with one terminal of the battery, means connecting the other terminal of the rear wheel brakes with one terminal of the rear wheel brake control circuit of the controller, separate means electrically connecting the other terminal of the front wheel brakes directly with one terminal of the front wheel brake control circuit of the controller, means independent of a ground circuit electrically connecting the other terminal of the rear wheel brake control circuit of the controller directly to the other terminal of the battery, and separate means independent of a ground circuit connecting the other terminal of the front wheel brake control circuit of the controller directly to the same terminal of the battery.

3. In an automotive vehicle having a battery and front and rear wheel electrically actuated brakes adapted to be energized by said battery, a potentiometric controller for said brakes comprising a front wheel control resistance winding, a separate rear wheel control resistance winding, separate front and rear wheel contact members each mounted for movement in contact with its respective control resistance winding from an off-position to an on-position, a single controller operating member adapted to move said contact members together from the off-position to the on-position, a conductor connecting each control resistance winding adjacent its full on-position to a first terminal of said battery, a switch adapted to be closed by initial movement of the controller operating member from the off-position, a second conductor connecting each control resistance winding adjacent its off-position through said switch to the second terminal of said battery, a third conductor connecting the front wheel contact member of the controller to one terminal of each front wheel brake, a fourth conductor connecting the rear wheel contact member of the controller to one terminal of each rear wheel brake, and at least one fifth conductor connecting the other terminals of the front and rear wheel brakes with said first terminal of the battery.

4. In an automotive vehicle equipped with front and rear wheel electrically actuated brakes, a controller for said brakes having separate front and rear wheel control resistance windings, a controller operating member for operating said controller, said control resistance windings being so constructed and arranged relatively to each other that, as the controller operating member is advanced toward the point of maximum brake energization with the vehicle moving forwardly, that portion of the total braking effort produced and attributable to energization of the front wheel brakes is increased in approximately the same proportion as the load carried by the vehicle front wheels is increased due to the increasing rate of deceleration of the vehicle which causes the center of gravity thereof to shift forward, means electrically connecting the front wheel brakes with the front wheel control resistance winding, and separate means connecting the rear wheel brakes with the rear wheel control resistance winding.

5. In an automotive vehicle equipped with front and rear wheel electrically operated brakes, a controller for said brakes having separate front and rear wheel control circuits for controllably energizing said brakes, said separate control circuits being so constructed and arranged that as the controller is advanced toward the point of maximum brake energization with the vehicle moving forwardly, the degree of energization of the front wheel brakes is increased relatively to the degree of energization of the rear wheel brakes approximately in the same proportion that the load carried by the front wheels of the vehicle increases relatively to the load carried by the rear wheels as the increasing rate of deceleration of the vehicle causes the center of gravity thereof to shift forwardly.

6. In an automotive vehicle equipped with front and rear wheel electrically operated brakes, a controller for said brakes having separate front and rear wheel control circuits for controllably energizing said brakes, said separate control circuits being so constructed and arranged that as the controller is advanced toward the point of maximum brake energization with the vehicle moving forwardly, that proportion of the total braking effort attributable to energization of the front wheel brakes is increased in approximately the same proportion that the increasing rate of deceleration of the vehicle causes the center of gravity thereof to be shifted forward and increase the proportion of the total load carried by the front wheels.

7. A controller for electric front and rear wheel vehicle brakes comprising a front wheel brake control resistance winding, a separate rear wheel brake control resistance winding, separate front and rear wheel contact members each mounted for movement in contact with its corresponding control resistance winding from an off-position to an on-position, and a single controller operating member adapted to move said contact members together from the off-position to the on-position.

8. A controller for electric front and rear wheel vehicle brakes comprising a front wheel brake control resistance winding, a separate rear wheel brake control resistance winding, separate front and rear wheel contact members each mounted for movement in contact with its corresponding control resistance winding from an off-position to an on-position, and a single controller operating member adapted to move said contact members together from the off-position to the on-position, the resistance of said front wheel control resistance winding being arranged to be cut out relatively more rapidly than the resistance of the rear wheel control resistance winding as the controller operating member is moved from the off-position toward the on-position.

9. A resistance controller for electric front and rear wheel vehicle brakes comprising a front wheel control resistance winding, a separate rear wheel control resistance winding, separate front and rear wheel contact members each mounted for movement in contact with its respective control resistance winding from an off-position to an on-position, a single controller operating member adapted to move said contact members together from the off-position to the on-position, means for connecting each control resistance winding adjacent its full on-position to one terminal of a source of electrical energy, means for connecting the front wheel contact member with the vehicle front wheel brakes, and means for connecting the rear wheel contact member with the vehicle rear wheel brakes.

10. A potentiometric controller for electric front and rear wheel vehicle brakes comprising a front wheel control resistance winding, a separate rear wheel control resistance winding, separate front and rear wheel contact members each mounted for movement in contact with its respective control resistance winding from an off-position to an on-position, a single controller operating member adapted to move said contact members together from the off-position to the on-position, means for connecting each control resistance winding adjacent its full on-position to one terminal of a source of electrical energy, a switch adapted to be closed by initial movement of the controller operating member from the off-position, means for connecting each control resistance winding adjacent its off-position through said switch to the other terminal of said source of electrical energy, means for connecting the front wheel contact member with the vehicle front wheel brakes, and means for connecting the rear wheel contact member with the vehicle rear wheel brakes.

WILLIAM F. PENROSE.